US006554218B2

(12) United States Patent
Buyce et al.

(10) Patent No.: US 6,554,218 B2
(45) Date of Patent: Apr. 29, 2003

(54) CABLE MANAGEMENT SPOOL

(75) Inventors: Douglas D. Buyce, Ada, MI (US);
Joseph D. Ruedinger, Grand Haven, MI (US); Jason E. Begin, Rockford, MI (US)

(73) Assignee: Steelcase Development Corporation, Caledonia, MI (US)

( * ) Notice: Subject to any disclaimer, the term of this patent is extended or adjusted under 35 U.S.C. 154(b) by 0 days.

(21) Appl. No.: 09/903,446

(22) Filed: Jul. 11, 2001

(65) Prior Publication Data

US 2003/0010862 A1 Jan. 16, 2003

(51) Int. Cl.[7] .......................... B65H 75/14; B65H 75/38
(52) U.S. Cl. ...................... 242/388.6; 242/396.5; 242/400.1; 242/405.1; 242/578; 242/588.6
(58) Field of Search ................ 242/388, 388.1, 242/388.5, 388.6, 396.5, 400.1, 404.3, 405.1, 405.2, 578, 578.2, 588.6, 129, 601

(56) References Cited

U.S. PATENT DOCUMENTS

| 2,029,975 A | * | 2/1936 | Winchester | 242/129 |
|---|---|---|---|---|
| 2,319,731 A | | 5/1943 | Garrett | |
| 2,364,262 A | | 12/1944 | Wehringer | |
| 2,533,495 A | | 12/1950 | Moffett | |
| 2,533,731 A | | 12/1950 | Gomberg | |
| 2,545,145 A | * | 3/1951 | Hoyle | 242/129 |
| 2,553,097 A | | 5/1951 | Lampe | |
| 2,656,991 A | | 10/1953 | Neely | |
| 2,865,071 A | | 12/1958 | Clemens | |
| 2,952,420 A | | 9/1960 | Von Hoorn | |
| 3,062,475 A | | 11/1962 | Miller, Jr. | |
| 3,136,415 A | | 6/1964 | Sandström | |
| 3,208,121 A | | 9/1965 | Price | |
| 3,430,886 A | | 3/1969 | Sweeney | |
| 3,830,445 A | | 8/1974 | Moore | |
| 4,390,142 A | | 6/1983 | Cheng | |
| 4,726,536 A | | 2/1988 | Lerner et al. | |
| 4,802,638 A | | 2/1989 | Burger et al. | |
| 5,531,333 A | | 7/1996 | Vara | |
| 5,772,152 A | | 6/1998 | Maldonado | 242/597 |
| 5,779,175 A | | 7/1998 | Shirahase | 242/388.1 |
| 5,809,900 A | | 9/1998 | Alexander et al. | |
| 5,853,136 A | | 12/1998 | Lai | 242/388.1 |
| 5,873,540 A | | 2/1999 | Hardin | 242/405.1 |
| 5,915,640 A | | 6/1999 | Wagter et al. | 242/388.1 |
| 5,984,224 A | | 11/1999 | Yang | 242/400.1 |
| 5,992,787 A | | 11/1999 | Burke | 242/388.1 |
| 6,003,804 A | | 12/1999 | Vara | 242/400.1 |
| 6,065,708 A | | 5/2000 | Matsubara | 242/388.1 |

FOREIGN PATENT DOCUMENTS

| FR | 2432469 | 8/1978 |
| GB | 2145393 A | 3/1985 |
| WO | WO9001821 | 2/1990 |

* cited by examiner

*Primary Examiner*—John M. Jillions
(74) *Attorney, Agent, or Firm*—Price, Heneveld, Cooper, DeWitt & Litton

(57) ABSTRACT

A cable management spool for storing a length of cable includes first and second rigid outer members that are movable relative to each other and define a gap of variable size therebetween. An intermediate member has at least one flexible flap, and the intermediate member is disposed between the first and second rigid outer members. The spool includes a spooling portion between the first and second outer members, wherein the spooling portion is adapted to have a length of cable wound about the spooling portion. The intermediate member is movable relative to at least one of the first and second rigid outer members, and the at least one flap substantially occupies the gap and is adapted to substantially conceal the length of cable.

32 Claims, 4 Drawing Sheets

CABLE MANAGEMENT SPOOL

BACKGROUND OF THE INVENTION

Various holders have been developed for storing electrical lines and the like. For example, UK Patent Document 2,145,393A discloses a cable reel including a hub and a resiliently deformable lip member to retain a cable wound on the hub. Other spools, such as that disclosed in U.S. Pat. No. 5,873,540 include upper and lower extents that have central tube portions interconnected in an adjustable manner. U.S. Pat. No. 2,319,731 discloses a cord holder having shell portions that are telescopically engaged. Gomberg U.S. Pat. No. 2,533,731 discloses a bobbin for knitting yarn and the like having two members that are generally disk shaped, and can be moved between "closed" or "normal" relationships relative to one another.

SUMMARY OF THE INVENTION

One aspect of the present invention is a cable management spool for storing a length of cable. The cable management spool includes first and second rigid outer members that are movable relative to each other and define a gap of variable size therebetween. An intermediate member has at least one flexible flap, and the intermediate member is disposed between the first and second rigid outer members. The spool includes a spooling portion between the first and second outer members, wherein the spooling portion is adapted to have a length of cable wound about the spooling portion. The intermediate member is movable relative to at least one of the first and second rigid outer members, and the at least one flap substantially occupies the gap between the first and second rigid outer members to substantially conceal the length of cable.

Another aspect of the present invention is a cable management spool for storing a length of cable. The cable management spool includes first and second rigid outer members, each having an extension member and wherein the extension members are telescopingly engaged with one another and define a central spooling portion. A flexible member is disposed circumferentially about the central spooling member and has at least one flap member extending from outer peripheral edge of the flexible member. The flexible member is disposed between the first and second outer members. A length of cable can be pressed through the flexible member, and is wound about the central spooling portion.

Yet another aspect of the present invention is a cable management spool including a pair of disk-like spaced apart housing members defining a gap therebetween. Each of the housing members defines an annular peripheral edge. A spooling portion extends between and interconnects the housing members, and the spooling portion is adapted to permit winding of a line about the spooling portion. An annular flexible flap extends across at least a substantial portion of the gap adjacent the peripheral edges of the housing members.

These and other features, advantages, and objects of the present invention will be further understood and appreciated by those skilled in the art by reference to the following specification, claims, and appended drawings.

DETAILED DESCRIPTION OF PREFERRED EMBODIMENT

Figure 1:
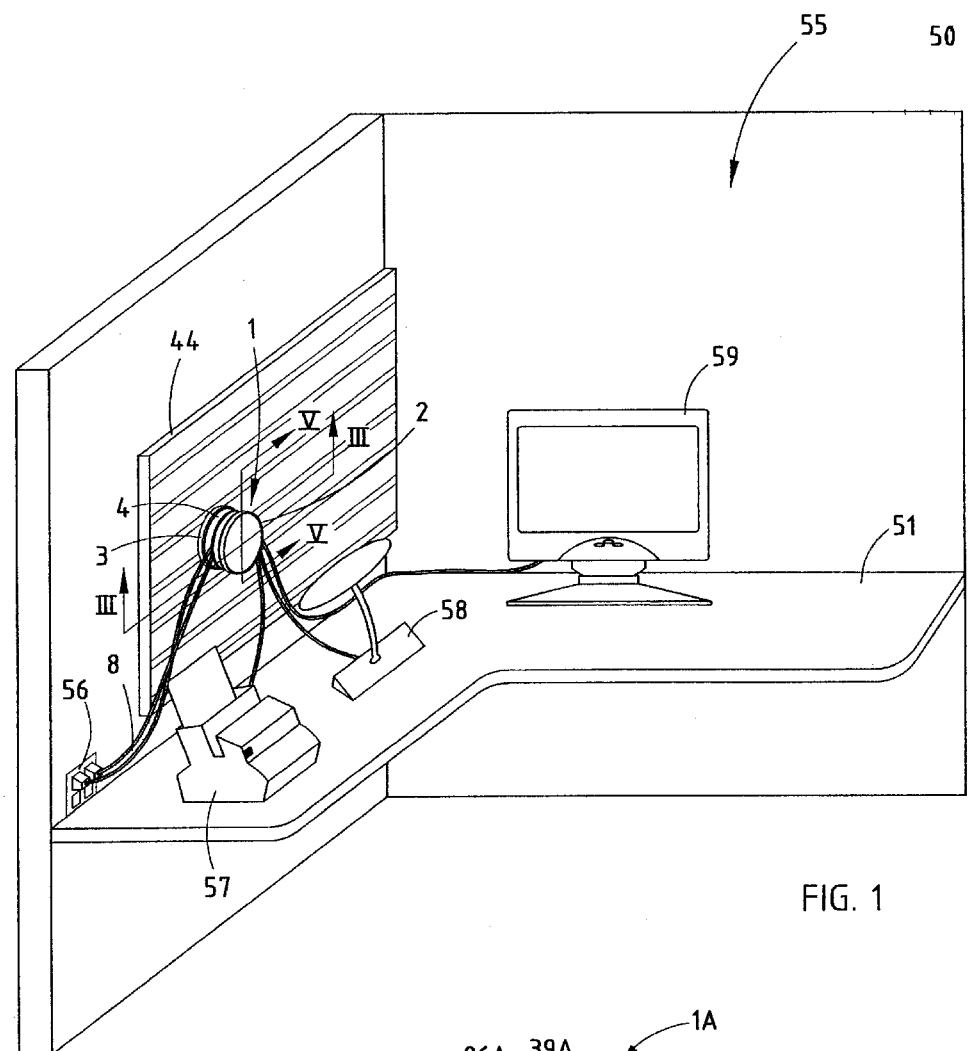
FIG. 1 is a perspective view of a workspace including a cable management spool according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
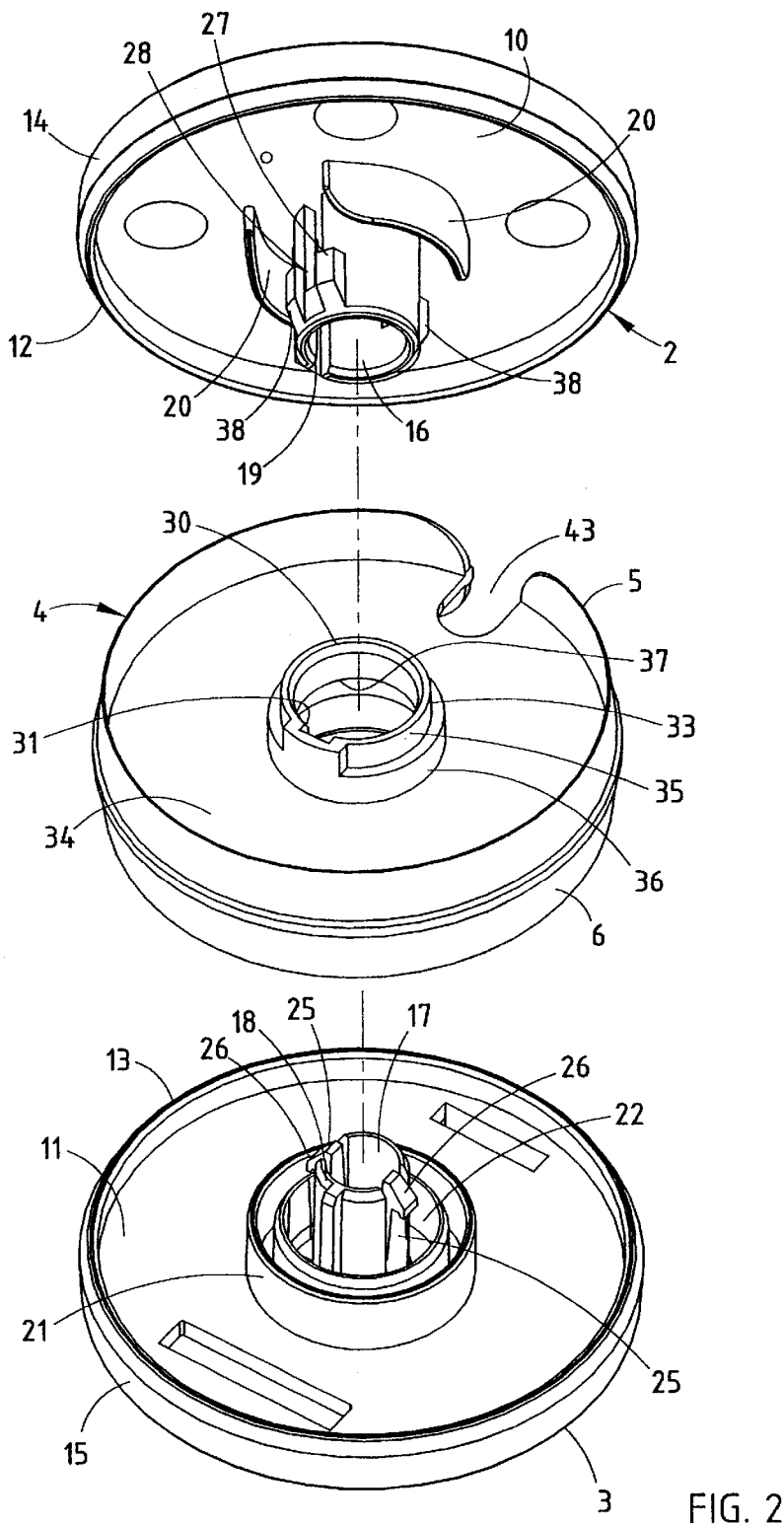
FIG. 2 is an exploded perspective view of the cable management spool of FIG. 1.
Figure 3:
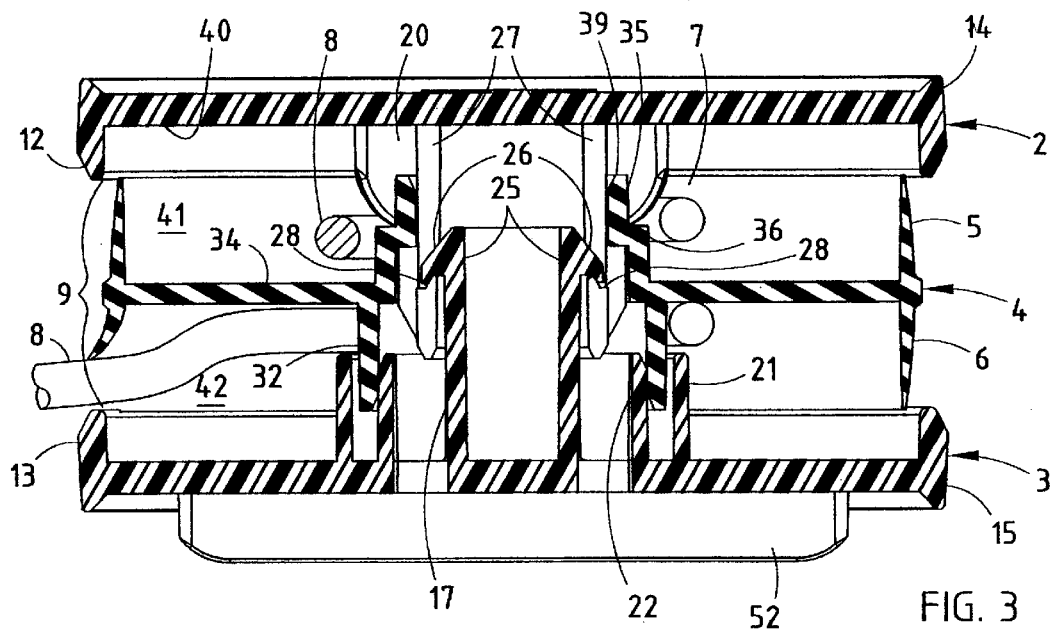
FIG. 3 is a cross-sectional view of the cable management spool of FIG. 1 taken along the line III—III, showing the cable spool in the expanded configuration.
Figure 4:
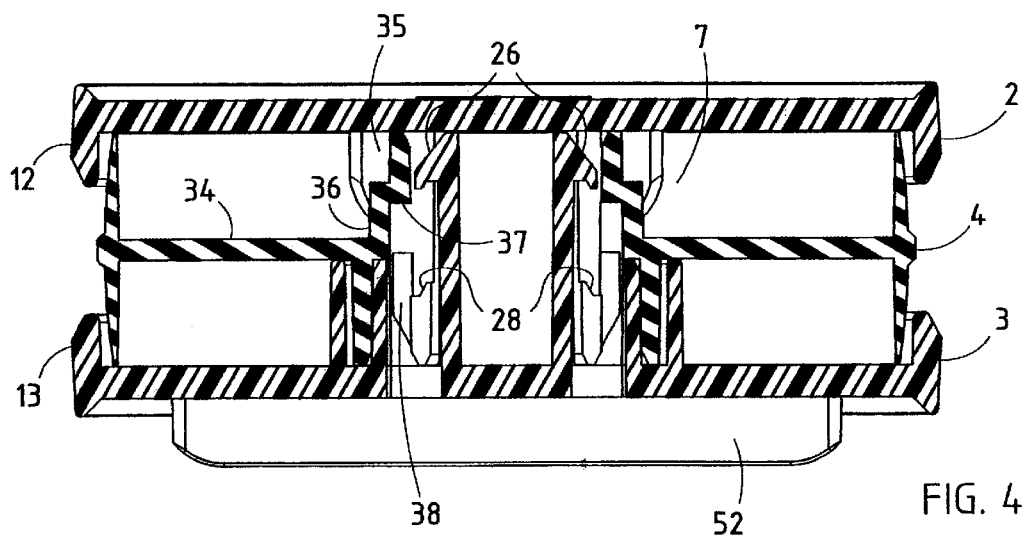
FIG. 4 is a cross-sectional view of the cable management spool of FIG. 3 showing the cable management spool in the collapsed configuration.

The reference numeral 1 (FIG. 1) generally designates a cable management spool embodying the present invention, which may be utilized in offices, and other similar settings and environments. In the illustrated example, cable management spool 1 includes first and second rigid members 2 and 3 that are made of a polymer material and are movable relative to each other and define a gap 9 (see also FIG. 3) of variable size therebetween. An intermediate member 4 (FIG. 2) is made of an elastomeric material including first and second flexible flaps 5 and 6, and the intermediate member 4 is disposed between the first and second rigid outer members 2 and 3 when assembled. With further reference to FIGS. 3 and 4, a spooling portion 7 between the first and second outer members 2 and 3 is adapted to have a length of cable 8 wound about the spooling portion 7. The intermediate member 4 is movable relative to at least one of the first and second rigid outer members 2 and 3, and the flaps 5 and 6 substantially occupy the gap 9 to conceal the length of cable 8 in the cable management spool 1.

The first rigid member 2 includes a disk-like body portion 10, and the second rigid member 3 includes a disk-like body portion 11. Rigid members 2 and 3 are made of a polymer material. The rigid member 2 includes an annular flange 12, and the second rigid member 3 includes an annular flange 13. When assembled, the annular flanges 12 and 13 extend towards one another adjacent the first and second peripheral edges 14 and 15 of the first and second rigid outer members 2 and 3, respectively. First rigid member 2 includes a generally cylindrical, tubular extension 16 (FIG. 2) that telescopically engages a second cylindrical extension 17 of the second rigid member 3 to telescopically interconnect the first and second rigid outer members 2 and 3. A key or protrusion 18 of extension 17 is received in a groove or cutout 19 of cylindrical extension 16 to prevent rotation of the first rigid member 2 relative to the second rigid member 3. A pair of flanges 20 extend from the disk-like body portion 10 of first rigid member 2 to provide a surface for winding of the cables, thus preventing contact and/or interference of the cable 8 with the inter-engaging of the cylindrical extensions 16 and 17. The second rigid member 3 includes an outer annular flange 21 and an inner annular flange 22. Flanges 21 and 22 each have a generally tubular cylindrical shape and extend away from the disk-like body portion 11 around the cylindrical extension 17. The generally cylindrical extension 17 of second rigid member 3 includes a pair of opposed flexible prongs or extensions 25, each having a barb 26 adjacent the end thereof. The first rigid member 2 includes a pair of elongated slot like openings 27, and the first and second rigid members 3 can be assembled by pushing the members 2 and 3 together such that the barbs 26 snap into engagement with the openings 27. The barbs 26 contact the ends 28 of the openings 27 when in the fully extended position (FIG. 3) to prevent disassembly of the rigid members 2 and 3.

Flexible intermediate member 4 includes a center connecting portion 30 having an elongated keyway 31 that receives the key or protrusion 18 of second rigid member 3. The keyway 31 ensures that the intermediate member 4 does not rotate relative to the first and second rigid members 2 and 3, yet permits axial sliding motion of the intermediate member relative to the first and second rigid members 2 and 3. The center connecting portion 30 of intermediate member 4 includes a cylindrical flange 32 (FIG. 3) that is received between the flanges 21 and 22 of second rigid member 3 when assembled. A second generally cylindrical flange 33 extends from a disk-like center portion 34 of intermediate member 4. The cylindrical portion 33 includes a larger diameter portion 36 directly adjacent the disk-like portion 34, and a smaller diameter end portion 35. The smaller and larger diameter portions 35 and 36 form a step 37. Cylindrical extension 16 of rigid member 2 includes four barbed end portions 38. When assembled, the barbs 38 are engageable with the step 37 of cylindrical portion 33.

First and second rigid members 2 and 3 slidably engage one another, such that the cable management spool 1 can be shifted between the fully extended configuration of FIG. 3, or collapsed to the fully retracted configuration illustrated in FIG. 4. The first and second rigid members 2 and 3 may also be positioned in a range of partially collapsed configurations between the configurations illustrated in FIGS. 3 and 4. If the cable management spool 1 is being expanded from the configuration of FIG. 4 to the configuration of FIG. 3, the contact of the barbs 38 against the step 37 will cause the intermediate member 4 to shift, thereby maintaining the intermediate member 4 at a centered position between the rigid members 2 and 3. Conversely, if the cable management spool 1 is being collapsed from the configuration of FIG. 3 to the configuration of FIG. 4, the first rigid member 2 will shift towards the member 3 without moving the intermediate member 4, until end edge 39 of the cylindrical portion 33 contacts inner surface 40 of first rigid member 2. Further shifting of the rigid members 2 and 3 towards one another will cause the intermediate member 4 to shift towards the second rigid member 3 due to the contact of the end edge 39 with the inner surface 40 of rigid member 2. The cable management spool 1 thereby provides a pair of side-by-side generally cylindrical first and second cable storage cavities 41 and 42, respectively, the size of each of which can be selectively varied. The arrangement described in detail above also ensures that the intermediate member 4 remains generally centered between the rigid members 2 and 3, thereby ensuring that the first and second cable storage cavities 41 and 42 are about the same size, regardless of whether the cable management spool is in the fully extended configuration of FIG. 3, or the fully collapsed configuration of FIG. 4, or an intermediate partially collapsed configuration.

Figure 5:
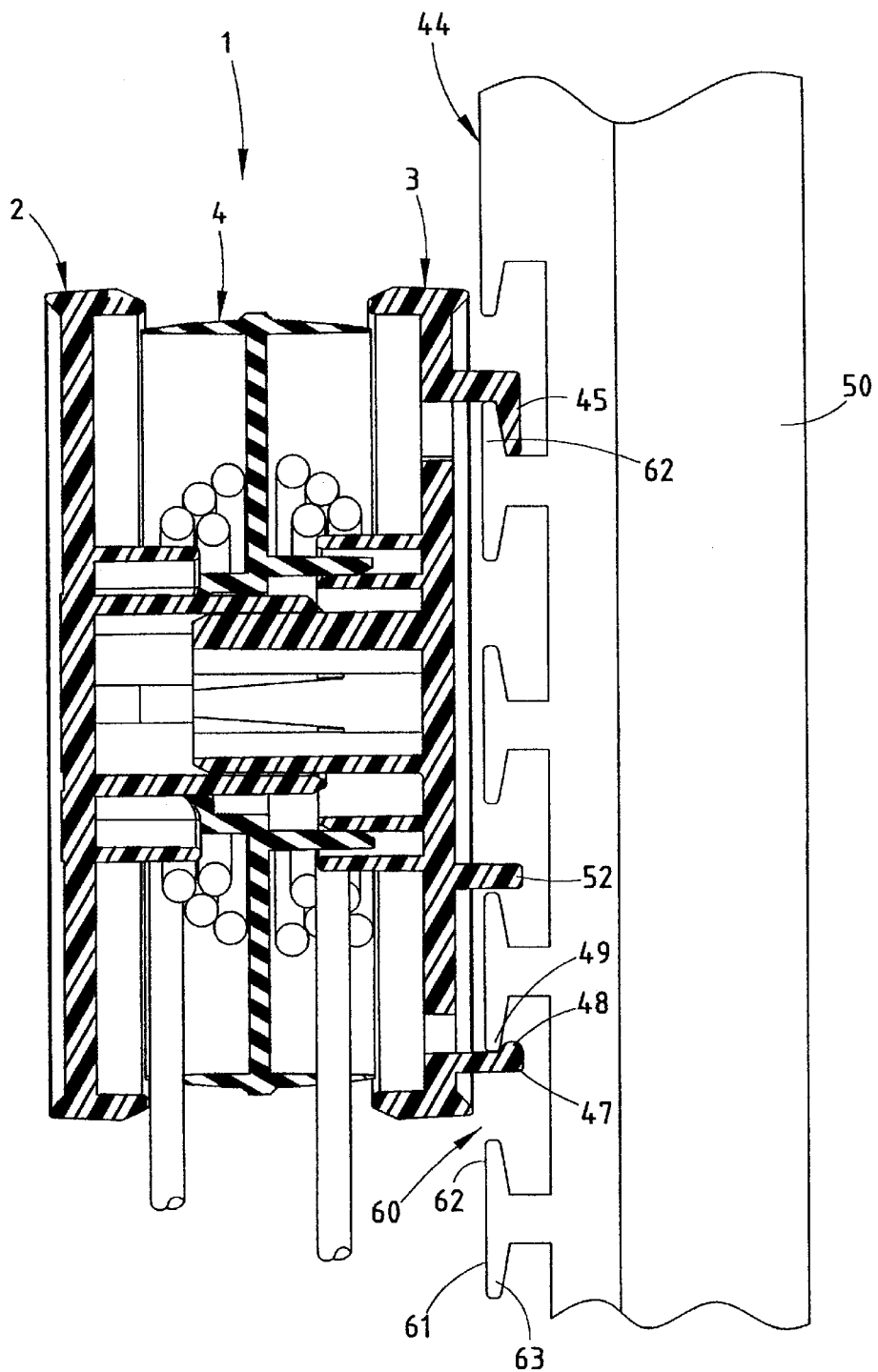
FIG. 5 is a partially fragmentary, cross-sectional view of the cable management spool of FIG. 1 showing the mounting of the cable management spool on a slatwall.

Intermediate member 4 includes a cutout 43 (FIG. 2) through which the cables 8 may extend to permit routing of the cables 8 from the cavities 41 and 42 to the exterior of the cable management spool 1, without requiring flexing of the first and second flaps 5 and 6 of intermediate member 4. Also, a single cable 8 may be routed through cutout 43, such that a first end of the cable extends out of cavity 41, and a second end extends out of cavity 42. With further reference to FIG. 5, second rigid member 3 includes a hook 45 that engages a lip 62 of a conventional slatwall 44 that is mounted to a conventional partition 50 in a known manner. Slatwall 44 includes a plurality of elongated slots 60 defined by T-shaped members 61 having upwardly extending lips 62 and downwardly extending lips 63. Rigid member 3 includes a leg 47 having a small lip or bead 48. The cable management spool 1 can thereby be assembled to the slatwall 44 by first engaging the hook 44 on a lip 62, and the cable management spool 1 is then rotated downwardly until the lip 48 snaps over lower edge 49 of a lip 63. The cable management spool 1 may also be positioned in a horizontal orientation resting on a worksurface 51. A support leg 52 extends from the disk-like portion 11 of rigid member 3, such that the cable management spool 1 can be stably supported on the worksurface 51 due to the contact of the hook 45 and leg 52 on the worksurface 51.

As illustrated in FIG. 1, the cable management spool 1 may be mounted to a slatwall 44 in a workspace 55 defined by a conventional partition 50. Electrical power lines 8 may be routed from a conventional power receptacle 56 to supply power to electrically powered items such as a printer 57, a tasklight 58, or computer monitor 59. The electrical lines or cables 8 may be wound around the cable management spool 1 by flexing of the flaps 5 and/or 6. The flaps 5 and 6 conceal the cables disposed in the storage cavities 41 and 42. The flaps 5 and 6 also prevent inadvertent unwinding of the cables 8. The elongated keyway 31 of intermediate member 4 and the key 18 of second rigid member 3 ensure that the cutout 43 of intermediate member 4 is always positioned downwardly when the cable management spool 1 is mounted on a slatwall 44 as illustrated in FIG. 1. Thus, the power lines 8 can be routed through the cutout 43 without requiring flexing of the flaps 5 and 6. Also data/phone lines may also be stored utilizing cable management spool 1. For example, power lines could be stored in cavity 41, and data/phone lines could be simultaneously stored in cavity 42.

The cable management spool 1 provides a pair of storage cavities, such that a plurality of electrical and/or data lines can be simultaneously stored on the spool 1 without the electrical lines 8 becoming entangled with one another. Furthermore, the cable management spool 1 can be extended and retracted to adjust the size of the storage cavities as required for a particular size and/or length of cable. Still further, the flexible intermediate member shifts as the outer members 2 and 3 are shifted relative to one another, thereby ensuring that the first and second storage cavities 41 and 42 remain approximately the same size. The cable management spool 1 can be quickly and easily snapped onto a slatwall, and the snap-attachment of the cable management spool 1 to the slatwall prevents inadvertent dislodgment of the cable management spool 1 from the slatwall 44. Alternately, the cable management spool 1 can be abuttingly supported on a worksurface 51, and the configuration of the hook 45 and support leg 52 ensures that the cable management spool 1 remains stable and horizontal.

Figure 6:
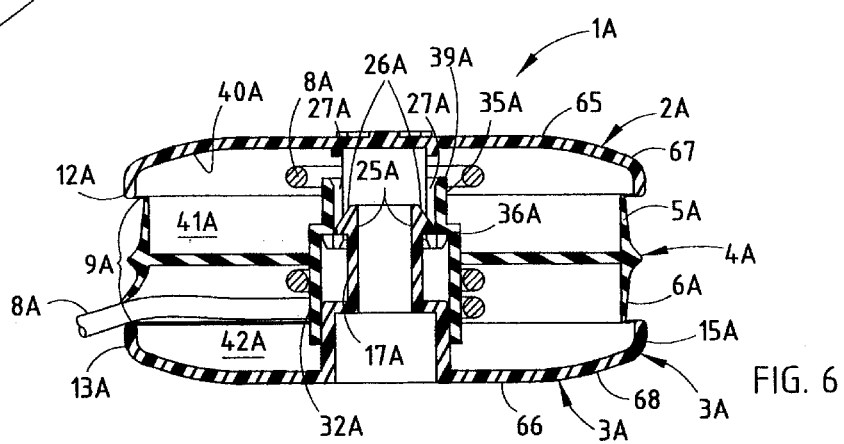
FIG. 6 is a cross-sectional view of a second embodiment of the cable management spool of the present invention that is taken from substantially the same perspective as FIG. 3.

FIG. 6 illustrates a second embodiment 1A of the cable management spool of the present invention. FIG. 6 is taken from substantially the same perspective as FIG. 3. The second embodiment 1A is substantially similar to the first embodiment 1, except that the outer surface 65 of rigid member 2A has a convex curved annular outer surface 67, and rigid member 3A includes an outer surface 66 having an annular convex curve 68. Thus, rigid members 2A and 3A have a shallow, bowl-like outer surface shape. Also, the second embodiment 1A does not include the support leg 52 of the first embodiment, flanges 20, or outer annular flange 21. Therefore, cable 8A wraps around cylindrical portions 32A, 35A and 36A. Other than these differences, the features of the second embodiment 1A are substantially similar to the those of the first embodiment, and corresponding features of the two embodiments utilize the same part members, except that the letter "A" has been added to distinguish the features of the second embodiment from those of the first. Because the telescoping function, as well as the positioning and operation of the flexible intermediate member 4A of the second embodiment 1A of the cable management spool are substantially the same as described above for the first embodiment, these features will not be described in detail herein.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A cable management spool for storing a length of cable comprising:

first and second rigid outer members;

said first and second rigid outer members relatively movable to each other and defining a gap of variable size therebetween;

an intermediate member having a disk like central portion defining an axis and a circular peripheral edge, said intermediate member having at least one flexible flap extending generally parallel to said axis for said peripheral edge and defining, in cross section, a length and a base thickness adjacent said central portion, said length being substantially greater than said base thickness, said intermediate member disposed between said first rigid outer member and said second rigid outer member;

a spooling portion between said first and second outer members and wherein said spooling portion is adapted to have a length of cable wound about said spooling portion; and wherein said intermediate member is movable relative to at least one of said first and second rigid outer members and said at least one flap substantially occupies said gap and is adapted to substantially conceal the length of cable.

2. The cable management spool defined in claim 1, wherein:

said spooling portion comprises first and second extension members respectively disposed on said first and second rigid outer members, said extension members telescopingly engaging each other.

3. The cable management spool defined in claim 1, wherein:

one of said first and second rigid outer members includes a hook adapted to attach the spool to a vertically oriented surface.

4. The cable management spool defined in claim 1, wherein:

said first and second rigid outer members each include a flange on a peripheral edge extending inwardly.

5. The cable management spool defined in claim 4, wherein:

said relative movement of said first and second outer members moves said first and second outer members between a first position and a second position wherein said first position defines a first gap and said second position defines a second larger gap.

6. The cable management spool defined in claim 5, wherein:

said flap is positioned radially inwardly of each of said flanges and said flanges partially conceal said flap in said first position and said flanges partially conceal a smaller portion of said flap in said second position.

7. The cable management spool defined in claim 1, wherein:

said gap varies in size from a narrower gap concealing a first volume for receiving cable to a wider gap concealing a second larger volume for receiving cable.

8. The cable management spool defined in claim 1, wherein:

said intermediate member includes a center portion partitioning said volume for receiving cable and said flap includes two opposing flexible flap extensions extending outwardly towards said first and second rigid outer members from said center portion.

9. The cable management spool defined in claim 1, wherein:

said intermediate member and said spooling portion have a unitary construction.

10. A cable management spool for storing a length of cable comprising:

first and second rigid outer members;

said first and second rigid outer members relatively movable to each other and defining a gap of variable size therebetween;

an intermediate member having at least one flexible flap, said intermediate member disposed between said first rigid outer member and said second rigid outer member;

a spooling portion between said first and second outer members and wherein said spooling portion is adapted to have a length of cable wound about said spooling portion;

wherein said intermediate member is movable relative to at least one of said first and second rigid outer members and said at least one flap substantially occupies said gap and is adapted to substantially conceal the length of cable;

said spooling portion comprises first and second extension members respectively disposed on said first and second rigid outer members, said extension members telescopingly engaging each other and wherein:

one of said telescoping extension members includes a catch member for engaging said intermediate member and centrally positioning said intermediate member between said first and second outer members during relative movement of said first and second outer members.

11. A cable management spool for storing a length of cable comprising:
- first and second rigid outer members;
- said first and second rigid outer members relatively movable to each other and defining a gap of variable size therebetween;
- an intermediate member having at least one flexible flap, said intermediate member disposed between said first rigid outer member and said second rigid outer member;
- a spooling portion between said first and second outer members and wherein said spooling portion is adapted to have a length of cable wound about said spooling portion;
- wherein said intermediate member is movable relative to at least one of said first and second rigid outer members and said at least one flap substantially occupies said gap and is adapted to substantially conceal the length of cable; and wherein:
- said flap includes an outer surface having a cable access opening.

12. A cable management spool for storing a length of cable comprising:
- first and second rigid outer members telescopingly engaged with one another and defining a central spooling portion;
- a flexible member disposed circumferentially about said central spooling member between said first and second outer members and having at least one flap member extending from an outer peripheral edge of said flexible member, said flap member defining, in cross section, a length and a thickness adjacent said peripheral edge, said length being substantially greater than said thickness; and
- wherein the length of cable can be pressed through said flexible member and is windable about said central spooling portion.

13. The cable management spool defined in claim 12, wherein:
- said first and second outer members are relatively movable and define a gap of variable size therebetween.

14. The cable management spool defined in claim 13, wherein:
- one of said telescoping extension members includes a catch member for engaging said flexible member and centrally positioning said flexible member between said first and second outer members during said relative movement of said first and second outer members.

15. The cable management spool defined in claim 13, wherein:
- said gap varies in size from a narrower gap concealing a first length of cable to a wider gap concealing a second larger length of cable.

16. The cable management spool defined in claim 13, wherein:
- said flexible member is movable relative to said first and second rigid outer members such that said at least one flap may be repositioned to substantially occupy said gap and conceal an interior cable storage volume defined by said first and second outer rigid members.

17. The cable management spool defined in claim 12, wherein:
- said flexible member includes a center portion partitioning said length of cable and said flap includes two opposing flap extensions extending outwardly towards said first and second rigid outer members from said center portion.

18. The cable management spool defined in claim 12, wherein:
- one of said first and second rigid outer members includes a hook to enable attachment of the spool to a vertically oriented surface.

19. The cable management spool defined in claim 12, wherein:
- said flexible member includes an outer surface and an access opening disposed on said outer surface.

20. The cable management spool defined in claim 12, wherein:
- said first and second rigid outer members each include a flange on a peripheral edge extending inwardly.

21. The cable management spool defined in claim 20, wherein:
- said first and second outer members are relatively movable and define a first position and a second position wherein said first position defines a first gap and said second position defines a second larger gap.

22. The cable management spool defined in claim 21, wherein:
- said flap is positioned radially inwardly of each of said flanges and said flanges partially conceal said flap in said first position and said flanges partially conceal a smaller portion of said flap in said second position.

23. A cable management spool, comprising:
- a pair of disk-like spaced apart housing members defining a gap therebetween, each said housing member defining an annular peripheral edge;
- a spooling portion extending between and interconnecting said housing members, said spooling portion adapted to permit winding of an electrical line around said spooling portion;
- a generally annular flexible flap extending across at least a substantial portion of said gap adjacent said peripheral edges of said housing members; and
- an electrical line at least partially wound around said spooling portion, said electrical line including a plug at one end adapted to plug into an electrical receptacle.

24. The cable management spool defined in claim 23, wherein:
- said housing members are telescopically interconnected such that the size of said gap can be selectively varied.

25. The cable management spool defined in claim 23, including:
- an intermediate member having a body portion extending radially outwardly from said spooling portion between said housing members and defining a peripheral edge, said body portion and said housing members together define first and second side-by-side generally cylindrical cavities; and wherein:
- said flexible flap extends from said body portion generally transverse to said body portion to close off said first one of said cylindrical cavities.

26. The cable management spool defined in claim 25, wherein:
- said flexible flap comprises a first flexible flap; and including:
- a second flexible flap extending from said body portion and closing off said second cylindrical cavitie.

27. The cable management spool defined in claim 26, wherein:
- said spooling portion includes a catch that engages said intermediate member and shifts said intermediate member as the size of said gap is varied.

28. A combination office partition panel and cable management spool for storing a length of cable, comprising:

at least one vertically oriented office partition panel;

a cable management spool comprising:

first and second rigid outer members;

said first and second rigid outer members relatively movable to each other along an axis and defining a gap of variable size therebetween;

an intermediate member having at least one resilient member, said intermediate member disposed between said first rigid outer member and said second rigid outer member;

a spooling portion between said first and second outer members and wherein said spooling portion is adapted to have a length of electrical cable wound about said spooling portion;

wherein said intermediate member is movable relative to at least one of said first and second rigid outer members and said at least one flap substantially occupies said gap and is adapted to substantially conceal the length of cable, and said cable management spool is secured to said partition panel; and an electrical cable having at least a portion thereof wound about said spooling portion.

29. The combination office partition panel and cable management spool of claim 28, including:

a slatwall secured to said partition panel, said slatwall having a plurality of horizontally extending slots; and wherein:

said cable management spool having a hook adapted to be received in a selected one of said slots to retain said spool on said slatwall.

30. The combination office partition panel and cable management spool of claim 29, including:

an extension spaced apart from said hook, said extension and said together adapted to support said spool on a worksurface with said axis in a generally vertical orientation.

31. The combination office partition panel and cable management spool of claim 28, wherein:

said intermediate member has a generally flat disk-shaped center portion and defines an axis and a circular perimeter, said resilient member comprising a flexible flap extending from adjacent said circular perimeter parallel to said axis, said flap defining a length and a base thickness directly adjacent said center portion, said length being substantially greater than said thickness.

32. The combination office partition panel and cable management spool of claim 28, wherein:

said first and second rigid outer members and said intermediate member are interconnected in a manner that prevents relative rotation between said outer members and said intermediate member.

* * * * *

UNITED STATES PATENT AND TRADEMARK OFFICE
CERTIFICATE OF CORRECTION

PATENT NO.    : 6,554,218 B2
DATED         : April 29, 2003
INVENTOR(S)   : Douglas D. Buyce et al.

It is certified that error appears in the above-identified patent and that said Letters Patent is hereby corrected as shown below:

Column 8,
Line 62, "cavitie" should be -- cavities --.

Signed and Sealed this

Seventh Day of October, 2003

JAMES E. ROGAN
*Director of the United States Patent and Trademark Office*